United States Patent [19]

Leffelaar et al.

[11] Patent Number: 5,691,420

[45] Date of Patent: Nov. 25, 1997

[54] PROCESS FOR MANUFACTURING MULTIARMED ASYMMETRICAL RADIAL BLOCK COPOLYMERS

[75] Inventors: Karel Hendrik Leffelaar; Jeroen Van Westrenen, both of Amsterdam, Netherlands

[73] Assignee: Shell Oil Company, Houston, Tex.

[21] Appl. No.: 572,974

[22] Filed: Dec. 15, 1995

[30] Foreign Application Priority Data

Dec. 23, 1994 [EP] European Pat. Off. ............ 94309737

[51] Int. Cl.⁶ .................................................. C08F 297/04
[52] U.S. Cl. .................... 525/314; 525/105; 525/251; 525/270; 525/299
[58] Field of Search ....................... 525/314, 105, 525/251, 270, 299

[56] References Cited

U.S. PATENT DOCUMENTS

| | | |
|---|---|---|
| 4,010,226 | 3/1977 | Crossland et al. ............ 525/271 |
| 5,212,249 | 5/1993 | Richie et al. ................. 525/258 |
| 5,369,175 | 11/1994 | Hoxmeier et al. . |
| 5,393,841 | 2/1995 | Himes et al. . |
| 5,446,093 | 8/1995 | Hoxmeier et al. . |
| 5,447,995 | 9/1995 | Hoxmeier et al. ............ 525/314 |

FOREIGN PATENT DOCUMENTS

| | | |
|---|---|---|
| 0314256 | 5/1989 | European Pat. Off. . |
| 0324992 | 7/1989 | European Pat. Off. . |
| 94/22931 | 10/1994 | WIPO . |
| 95/13314 | 5/1995 | WIPO . |

OTHER PUBLICATIONS

European Search Report–Dated Mar. 25, 1996.

*Primary Examiner*—Irina S. Zemel
*Attorney, Agent, or Firm*—Donald F. Haas

[57] ABSTRACT

The invention is a process for the manufacture of six-armed radial asymmetric block copolymers, comprising of the steps of anionically polymerizing first polymer arms, contacting the first polymer arms with a non polymerizable coupling agent containing 6 functional groups, the amount of the first polymer arms being substantially stoichiometrically corresponding to 4 of the functional groups, anionically preparing second polymer arms, different from the first polymer arms, in the same reactor, adding a polar compound capable of increasing the reactivity of the residual functional groups of the coupling agent, reacting these residual functional groups with the second polymers arms, and recovering the asymetric polymer. The asymmetric polymers are useful in adhesive, coating, or sealant compositions and in bitumen blends for roofing, and in sound deadening or vibration dampening compositions.

9 Claims, No Drawings

PROCESS FOR MANUFACTURING MULTIARMED ASYMMETRICAL RADIAL BLOCK COPOLYMERS

FIELD OF THE INVENTION

The invention relates to a process for manufacturing multiarmed asymmetrical radial block copolymers and to multiarmed asymmetrical blockcopolymers obtainable with such a process. More in particular the invention relates to a process for manufacturing four or six armed asymmetrical radial block copolymers, using a four or six functional silicon containing coupling agent and intermediate living polymer arms, initially prepared from a conjugated diene and/or a mono vinyl aromatic monomer, and more in particular styrene, by anionic polymerization.

BACKGROUND OF THE INVENTION

Processes for manufacturing of multiarmed asymmetrical radial block copolymers were known in principle from e.g. U.S. Pat. No. 4,010,226, European Patent Application No. 0314256, and U.S. Pat. No. 5,212,249.

U.S. Pat. No. 4,010,226 disclosed the preparation of branched block copolymers of controlled structure by reacting conjugated diene and/or styrenic monomer, such as monoalkenyl arene and/or monoalkenyl pyridine, with monolithium initiator to give monolithium terminated polymer of an average molecular weight of 7500, coupling with a poly(alkenyl compound) and reacting the resulting coupled polylithio intermediate with conjugated diene, monoalkenyl arene and/or monoalkenyl arene and/or alkenyl pyridine monomer at a temperature in the range of some −75° C. to +150°, each polymer branch so formed having an average molecualr weight of from 5000–1000,000.

The polymers obtained by said process and their hydrogenated derivatives were indicated to be used in footwear, adhesives, wire and cable coatings and automative parts.

From the European patent application No. 0314256 a method was know for preparing asymmetric radial polymers, comprising the steps of:

(a) contacting a first polymer having a single reactive end group with a coupling agent containing a plurality of functional groups which will react with the reactive end groups, the amount of said first polymer being substantially stoichiometrically corresponding with a part of the total amount of the functional groups, in such a way that the reaction between said first polymer and coupling agent proceeds substantially to completion.

(b) contacting in subsequent steps one or more polymers, being different from said first polymer and from each other and having a reactive end group, with the respective reaction production from each preceding step until all functional groups of the coupling agent have finally completely reacted, and (c) recovering the obtained asymetric radial polymer.

Said process was preferably used for coupling four arms, selected from polymers containing only polymerised conjugated diolefins and block copolymers comprising at least one monoalkenyl aromatic hydrocarbon polymer block and at least one conugated diolefin block, by means of silicon tetrachloride.

U.S. Pat. No. 5,212,249 disclosed a process for preparing asymmetric radial polymers, wherein the different polymeric arms are contacted sequentially with a non polymerizable coupling agent, preferably being a silicon containing coupling agent, having up to 12 functional sites. Contacting in the final step in said process which frequently but not necessarily always will be the second step in the process, was carried out in the presence of a polar compound suitable for increasing the amount of vinyl content in a conjugated diolefin polymer during the polymerization thereof. The polymers obtained according to this process showed a narrower relative arm distribution of the several asymmetric radial polymers produced and a significant increase of the amount of product having the devised ratio of polymeric arms. Non-polymerisable coupling agents having 3 or 4 functional groups were most preferred.

Useful polar compounds were selected from ethers, tertiary amines, pyridine and pyrolidene compounds, of which the di- and poly-functional ethers were preferred.

Said process was usually carried out in at least two separate reactors, to be used for the initial preparation of the first living polymer arm and the second living polymer arm respectively.

It will be appreciated that the hereinbefore discussed prior art processes did not enable to manufacture tailor made asymmetric block copolymers, containing one or more arms having a significantly varying molecular weight (Mw/MD>1.1 and in, particular >1.2) as desired for particular end use applications.

Therefore a process was aimed at for the manufacture of said radial asymmetric block copolymers, containing a combination of arms, having on the one hand a relatively narrow molecular weight distribution (Mw/Mn<1.1), and having on the other hand a broad molecular weight distribution, in one or two reactors by polymerisation of these arms, having broad molecular weight distributions (Mw/Mn>1.1 and in particular >1.2), i.e. having a significantly varying molecular weight, in the presence of the remaining functional groups of a coupling agent.

Therefore an object of the present invention was to provide an economically attractive process for the manufacture of said radial asymmetric block copolymers.

As a result of research and experimentation such a process aimed at has suprisingly been found.

SUMMARY OF THE INVENTION

Accordingly, the invention is a process for the manufacture of multiarmed radial asymmetric block copolymers, comprising of the steps of anionically polymerizing first polymer arms, contacting the first polymer arms with a non polymerizable coupling agent containing 6 functional groups, the amount of the first polymer arms being substantially stoichiometrically corresponding to 4 of the functional groups, anionically preparing second polymer arms, different from the first polymer arms, in the same reactor, adding a polar compound capable of increasing the reactivity of the residual functional groups of the coupling agent, reacting these residual functional groups with the second polymers arms, and recovering the asymmetric polymer.

DETAILED DESCRIPTION OF THE INVENTION

Accordingly, the invention is a process for the manufacture of six-armed radial asymmetric block copolymers, comprising of the steps:

(a) polymerization of a conjugated diene and/or a monoalkenyl aromatic hydrocarbon by means of an anionic monofunctional organo alkali metal initiator;

(b) contacting the obtained living first polymer, containing a single reactive metal end group with a non polymerizable coupling agent containing 6 functional groups which will react with the reactive end groups, the amount of said first polymer, being substantially stoichiometrically corresponding with 4 of the 6 functional groups, in such a way, that the reaction between the first living polymeric and the coupling agent proceeds substantially to completion;

(c) preparation of a second polymer arm, being different from said first living polymer in the same reactor, by polymerization of a conjugated diene and/or a monoalkenyl aromatic hydrocarbon initiated by an anionic monofunctional organoalkali metal initiator and/or a living, separately prepared poly(monoalkenyl) aromatic) or poly(conjugated diene) polymer arm;

(d) addition of a polar compound capable of increasing the reactivity of the residual functional groups of the coupling agent in the product of step (b), and reacting these residual functional groups with the remaining in situ formed second living polymers until all residual functional groups of the coupling agents have finally completely reacted, and (e) recovering the asymmetric radial polymer.

The first and second living polymer arm may be prepared from monomers selected from 1,3-butadiene, isoprene, 2,3 dimethyl 1,3 butadiene, 1,3 pentadiene, 1,3 hexadiene or mixtures thereof, on the one hand and from styrene & methylstrene, o-methylstyrene, p-methylstyrene, p-tert buty styrene; 1,3-dimethyl styrene or mixtures thereof, on the other hand. Preferably the first and second living polymer are comprising predominantly poly(conjugated diene) blocks and/or diblocks consisting of a predominantly poly (conjugated diene) block segment, and a predominantly poly(mono vinyl aromatic hydrocarbon), of which the second polymer block shows a significantly varying molecular weight.

With the term "predominantly" is meant that the blocks involved may be constituted by a major amount of one monomer, mixed with a minor amount (up to 40 wt %) of another comonomer, e.g. a major fraction of butadiene or isoprene mixed with a minor fraction of styrene, α-methyl styrene etc or a major fraction of styrene mixed with a minor fraction of 1,3 butadiene or isoprene or mixtures thereof. It will be appreciated that such comonomer mixtures may form tapered block copolymer segments or substantially random copolymer segments, which both may be included as arms in the complete multiarmed asymetric radial block copolymers. More preferably these first and second living polymers are selected from substantially pure homopolymers of 1,3-butadiene, substantially pure isoprene homopolymers, substantially pure homopolymers of styrene, and combinations thereof. In particular, combinations of a substantially pure poly (butadiene) homopolymer block or a substantially pure poly (isoprene) homopolymer block and a substantially pure poly (styrene) block are preferred for one of the two living polymers.

It will be appreciated that in the living polymers a high degree of 1,4 polymerisation (90-% or more) will preferably occur in case of poly(butadiene) polymers.

Preferred organo alkali metal initators for the steps (a) and (c) of the process of the present invention are lithium alkyl or lithium alkoxy compounds, lithium cycloalkyl, lithium alkyl substituted cycloalkyl, lithium phenyl or lithium alkyl substituted phenyl, having from 1 to 20 carbon atoms and preferably from 2 to 8 carbon atoms. More preferably tert-butyl lithium or sec-butyl lithium are used Preferred non polymerizable coupling agents to be used in step (b) are silicon containing compounds. In particular prefered coupling agents are selected from compunds of the formulae $X_3$—Si—O—Si—$X_3$ and $X_3$—Si—$(CH_2)_n$—Si—$X_3$, and the like, wherein X represents halogen, hydride, carboxyl, or alkoxy radicals having from 1 to 4 carbon atoms. Most preferrably $Cl_3$—Si—$CH_2$—$CH_2$—Si—$Cl_3$ or $(MeO)_3$—Si—$CH_2$—$CH_2$—Si—$(OMe)_3$ are used.

According to a preferred embodiments of the process of the present invention multiarmed asymmetric radial block copolymers are manufactured, using as coupling agent 1,2 bis(trichlorosilyl) ethane, by contacting said coupling agent with four initially prepared living poly(butadiene) or poly (isoprene) blocks or diblocks, containing a poly(styrene) and a poly(butadiene) or poly(isoprene) block, leaving two reactive sites available, which are subsequently reacted with another type of in situ prepared living block copolymer segments as hereinbefore specified, after reactivation of these residual sites with a polar compound, ultimately resulting in a 6 arm asymmetric radial block copolymer.

According to one most preferred embodiment, a one reactor multiarmed asymmetric block copolymer is prepared by a first step preparation of living poly(styrene)-poly (butadiene) diblock segments or living poly(styrene)-poly (isoprene) diblock segments, having a narrow molecular weight distribution; followed by coupling of these intermediate polymers with four of the most reactive coupling sites of 1,2-bis(trichlorosilyl)ethane (BTCSE) and initiation of new poly(butadiene) or poly(isoprene) segments, by means of an alkyllithium initiator such as butyl lithium followed by reactivation of the remaining functional sites of the partially coupled polymer by means of a polar compound and reacting these remaining functional sites.

It will be appreciated that as either propagation of e.g. poly(butadiene) chain segment or coupling onto the remaining coupling sites of BTCSE can take place, such a process yields a broader molecular weight distribution of the poly (butadiene) non load bearing chains.

According to another most preferred embodiment a two reactor multiarmed asymmetric radial block copolymer is prepared by a first preparation of poly(butadiene) living chains and coupled to four sites of BTCSE. Subsequently this coupled intermediate is reacted with poly(styrene) chains, prepared in a second reactor, and diene in order to complete the molecule with two poly(styrene)-poly (butadiene) arms, wherein the poly(butadiene) segment has a broad molecular weight distribution, after reactivation of the remaining functional sites of the partially coupled polymer by means of a polar compound.

In general, the living polymer segments useful as arms in the process of the present invention may be prepared by contacting the monomer or monomers with organo alkali metal compound in a suitable solvent at a temperature within the range of from −50° C. to 150° C. and preferably at a temperature within the range of from 0° C. to 100° C.

The living polymers to be introduced as arms in the process of the present invention, are in general contacted with the coupling agent in step (b) at a temperature within the range of from 0° C. to 100° C., at a pressure in the range of from 1 bar to 8 bar.

In step (c) second polymer segments, to be used as a second set of arms in the complete multiarmed radial asymmetric block copolymer and showing significantly varying molecular weights (relative broad molecular weight distribution), are prepared in the presence of the remaining, not reacted functional sites of the coupling reagent, which has reacted already with a first set of arms, having a relatively narrow molecular weight distribution.

Said second polymer segments may be prepared from a conjugated diene monomer, by means of added alkyl lithium initiator and more preferably butyl lithium initiator, or of added living separately prepared growing chains, constituted by at least a predominantly poly(monovinyl aromatic) segment, and more in particular poly(styrene) segment.

In step (d) the one or more polar compounds are added to increase the reactivity of the residual functional groups of the initially reacted coupling agent, i.e. the product of step (b).

The polar compounds to be used in step (d) of the process of the present invention to increase the re-activity of the remaining reacting sites of the coupling agent, include Lewis bases and more in particular ethers, such as diethyl ether, dibutyl ether tetrahydrofuran, ethylene glycol dimethyl ether, ethylene glycol dibutyl ether, diethylene glycol dimethyl ether, diethylene glycol dibutyl ether, dioxane, diethoxy propane, triethylene glycol ether, 1,2-dimethoxy benzene, 1,2,3-trimethoxy benzene, 1,2,4 trimethoxy benzene, 1,2,3-tri ethoxy benzene, 1,2,3-tributoxy benzene, 1,2,4-triethoxy benzene. Suitable other polar compounds include tertiary amines such as triethylamine, tributyl amine, $N,N,N^1,N^1$ tetramethyl ethylene diamine and pyridine and pyrrolidine compounds, such dipipyridino ethane or dipyrolidine ethane.

Preferred polar compounds have been found to be 1,2-diethoxypropane, dioxane, orthodimethoxy benzene, and diethylene glycol diethyl ether.

In general, the suitable polar compounds will be used at a concentration within the range from 0.001 to 20 wt % and preferably from 10 to 1000 ppm. relative to weight of the reaction mixture.

It will be appreciated that another aspect of the present invention is formed by the novel class of multiarmed radial asymmetric copolymers, obtainable by the hereinbefore specified process and which may be characterised by sets of different arms, one set of which comprising block segments showing a relatively broad molecular weight distribution (Mw/Mn>1.1) obtainable by in situ preparation in the presence of free active sites of a partially reacted coupling agent and another set of which comprising block segments showing a relatively narrow molecular weight distribution (Mw/Mn<1.1) originating from a separate reaction step. Preferably both block segments have a relatively high 1,4 polymerization degree ($\geq 90\%$) in case of poly(butadiene).

In general the monoblock polymer segments, showing a relatively narrow molecular weight distribution and constituting one set of arms of the radial asymmetric block copolymers, will normally have a weight average molecular weight in the range of from 5000 to 150,000 and preferably within the range of from 10,000 to 70,000. When a diblock or multiblock segment is used as arm, the weight average molecular weight will be within the range of from 20,000 to 250,000 and preferably from 20,000 to 100,000.

The multiarmed radial asymmetric block copolymers according to the present invention are characterised by varying (monovinyl-aromatic) contents while most of these poly(monovinylaromatic) segments remain still load bearing, resulting in a significant lower melt viscosity as compared with those of structurally related radial asymmetric block copolymers. Moreover these radial asymmetric block copolymers show a lower hardness (around 40 Shore A) and lower compression set (around 25%) and a high tan-$\delta$ level, independent of the temperature in combination with still a relative high (monovinylaromatic) content.

On the other hand the present multiarmed radial asymmetrical block copolymer are characterised by a combination of a high softening point with a low high-temperature viscosity. These properties make the present radial asymmetric block copolymers particular suitable for application in the area of adhesive, coating or sealant compositions or in blends with bitumen for use in roofing and sound deadening and/or vibration dampening compositions.

A particular aspect of the application of the hereinbefore specified radial asymmetric block copolymers is formed by their use in blends with bitumen.

Such bitumen-multiarmed radial asymmetric block copolymer compositions have been found to show very attractive combinations of properties which make them extraordinarily suitable for roofing compositions, road paving compositions, sound deadening and/or vibration dampening.

The particular class of multiarmed radial asymmetrical block copolymers as specified hereinbefore, has been found to show an increased mechanical loss (tan $\delta$) over a wide temperature (frequency) range in combination with lower high-temperature viscosity values.

In particular for sound deadening applications, those multiarmed radial asymmetric block copolymers can be used, containing two poly(styrene)-poly(butadiene) or poly(styrene)-poly(isoprene) arms, the poly(butadiene) or poly(isoprene) segments of which have a rather broad molecular weight distribution, and four poly(butadiene) or poly(isoprene) arms, having a relatively narrow molecular weight distribution.

Such multiarmed radial asymmetric block copolymers have been found to show a combination of a sufficient high softening point (i.e. 100° C. or higher) and a low high temperature viscosity, which allows a high filler content and a reduced elastic recovery which facilities vacuum molding of three dimensional sound deadening sheets.

The invention may be further illustrated by the following examples, however, without restricting its scope to these embodiments.

EXAMPLE 1

175 g of styrene was added to 6 l of cyclohexane at 50° C., after which 8.75 mol sec-butyl lithium was added. The reaction was completed after 40 minutes. Hereafter, 272 g of butadiene was added to the same reactor. The polymerization was allowed to proceed at 70° C. for 60 minutes. Then 2.19 mmol of the coupling reagent BTCSE was added and was allowed to react for 10 minutes.

After sampling from the reactor, the intermediate product (INT1) isolated by evaporating the solvent and was analysed by ASTM D 3314, GPC analysis by ASTM D 3536 (see Table I). The reaction mixture was cooled down to 60° C. before the reaction sequence was followed by subsequently adding 50 g of butadiene and 3.75 mmol of a second portion of sec-butyl lithium into the reaction mixture. After 5 minutes at 60° C. the remaining 86 g of butadiene was dosed to the reactor. The polymerisation was then allowed to proceed for 80 minutes at 60° C. The loose polybutadienyl arms formed were coupled to the remaining coupling side by adding 1.4 ml of diethoxypropane. The coupling reaction was allowed to proceed for another 30 minutes at 60° C.

The obtained polymer P1 was stabilised with 0.6% ionol and isolated by steam stripping to give white crumbs.

The polymer P1 was analysed by ASTM D 3314 and ASTM D3536 (see Table I).

EXAMPLE 2

In the first reactor 150 g of styrene was added to 3 l of cyclohexane at 50° C., after which 7.50 mmol sec-butyl lithium was added. The reaction was completed after 40 minutes. In the second reactor 233 g of butadiene is added to 3 l of cyclohexane at 70° C., after which 15 mmol sec-butyl lithium was added. The polymerization was allowed to proceed at 70° C. for 60 minutes. Then 3.75 mmol of the coupling reagent BTCSE was added and was allowed to react for 10 minutes.

After sampling from the second reactor, the intermediate product (INT2) isolated by evaporating the solvent and was analysed by ASTM D 3537 (see Table I).

The reaction sequence was followed by subsequently adding 117 g of butadiene and pumping the content of the first reactor to the second one. After 40 minutes at 70° C. the polymerization was completed and 1.4 mL diethoxypropane was added to allow the coupling reaction to occur. The coupling reaction was allowed to proceed for another 20 minutes at 70° C.

The obtained polymer P2 was stabilised with 0.6% Ionol and isolated by steam stripping to give white crumbs.

The polymer P2 was analysed by ASTM D 3314 and ASTM D3536 (see Table I).

EXAMPLE 3

A six armed asymmetrical styrene-butadiene blockcopolymer P3 was prepared as in example 1, except that 94 g styrene were added to 6 l cyclohexane at 50° C., after which 9.43 mol sec-butyllithium were added. After the polymerization was completed, 170 g butadiene were dosed to the same reactor. The polymerization continued until completion. Hereafter 2.37 mmol of the couppling reagent BTCSE were added. INT3 was sampled at this stage. The reaction sequence was followed by adding 50 g of butadiene to the reaction and 4.72 mmol sec-butyllithium. Hereafter, 186 g of butadiene were dosed to the reactor.

After the polymerization is completed 1.1 ml of diethoxypropane were added.

The polymer was stabilized and isolated similar to polymer P1.

The polymer P3 was analysed by ASTM D 3314 and D 3536 (see Table I).

EXAMPLE 4

A six armed asymmetrical styrene-butadiene blockcopolymer P4 was prepared as in example 1, except that 72 g styrene were added to 6 l cyclohexane at 50° C., after which 7.25 mol sec-butyllithium were added. After the polymerization was completed, 362 g butadiene were dosed to the same reactor. The polymerization continued until completion. Hereafter 1.81 mmol of the coupling reagent BTCSE was added. INT4 was sampled at this stage. The reaction sequence was followed by adding 65 g of butadiene to the reaction and 3.62 mol sec-butyllithium.

After the polymerization is completed 1.1 ml of diethoxypropane were added.

The polymer was stabilized and isolated similar to polymer P1.

The polymer P4 was analysed by ASTM D 3314 and D 3536 (see Table I).

EXAMPLE 5

A six armed asymmetrical styrene-butadiene blockcopolymer P5 was prepared as in example 1, except that 263 g styrene were added to 6 l cyclohexane at 50° C., after which 8.77 mmol sec-butyllithium were added. After the polymerization was completed, 158 g butadiene were dosed to the same reactor. The polymerization continued until completion. Hereafter 2.19 mmol of the coupling reagent BTCSE were added. INT5 was sampled at this stage. The reaction sequence was followed by adding 79 g of butadiene to the reaction and 4.39 mmol sec-butyllithium.

After the polymerization is completed 1.1 ml of diethoxypropane were added.

The polymer was stabilized and isolated similar to polymer P1.

The polymer P5 was analysed by ASTM D 3314 and D 3536.

EXAMPLE 6

A six armed asymmetrical styrene-butadiene blockcopolymer P6 was prepared as in example 1, except that 143 g styrene were added to 6 l cyclohexane at 50° C., after which 4.76mmol sec-butyllithium were added. After the polymerization was completed, 238 g butadiene were dosed to the same reactor. The polymerization continued until completion. Hereafter 1.19 mmol of the coupling reagent BTCSE were added. INT6 was sampled at this stage. The reaction sequence was followed by adding 50 g of butadiene to the reaction and 2.38 mmol sec-butyllithium. Hereafter, 69 g of butadiene were dosed to the reactor.

After the polymerization is completed 1.1 ml of diethoxypropane were added.

The polymer was stabilized and isolated similar to polymer P1.

The polymer P6 was analyzed by ASTM D 3314 and D 3536.

TABLE I

| Polymer | Structural parameters | | | | |
| --- | --- | --- | --- | --- | --- |
| | Styrene bound (%)[1] | $MW^{[2]}$ (kg/mol) | MWD Mw/Mn | CE (%)[3] | $X_2/(X_3 + X_4)^{[4]}$ (%) |
| INT1 | 40 | 296 | | 92 | 5.3 |
| P1 | 32 | 571–296[5] | | 98 | |
| INT2 | 40 | 107[6] | | 92[6] | 1.4 |
| P2 | 30.3 | 174–106[5] | | 90 | |
| INT3 | 36 | 156 | | 87 | 4.1 |
| P3 | 20 | 444–156[5] | 1.06 | 98 | |
| INT4 | 17 | 345 | | 92 | 1.4 |
| P4 | 15 | 398–365[5] | 1.01 | 95 | |
| INT5 | 63 | 229 | | 93 | 3.0 |
| P5 | 54 | 430–236[5] | 1.05 | 97 | |
| INT6 | 39 | 459 | | 92 | 3.8 |
| P6 | 30 | 933–475[5] | 1.06 | 93 | |

[1]ASTM D 3536
[2]Apparant mol. weight by ASTM 3536 as detected by UV absorption at 254 nm.
[3]CE: Coupling Efficiency is the weight ratio of the coupled block copolymer (or homopolymer) to the weight of the block copolymer (homopolymer) before coupling as detected by UV absorption at 254 nm.
[4]Weight ratio 2 (=$X_2$) to the sum of 3- and 4- armed ($X_3 + X_4$) block copolymer (or homopolymer) in percentages.
[5]Compared to the GPC diagram of the intermediate product (INT), a high molecular weight tail is formed due to the attachment of growing butadiene arms on the coupling side during butadiene polymerization. Both molecular weight extremes are included in the Table 1.
[6]As detected by refractive index.

TABLE II

Polymer properties

| Polymer Properties | TR 1186[1] | P1 | P2 |
|---|---|---|---|
| Melt index [g/10 min][2] | 0 | 0 | 5.0 |
| Tensile strength [MPa] | 18.5 | 10.5 | 2.0 |
| Modulus 300% [MPa] | 3.0 | 3.1 | 1.5 |
| Elongation [%] | 650 | 600 | 330 |
| Hardness [ShA] | 80 | 79 | 40 |
| Compression set [%] | 48 | 57 | 25 |

[1]Commercially available under tradename CARIFLEX TR 1186 and used as comparison.
[2]Melt index has been measured at 200° C. with a 5 kg load.

EXAMPLE 7

Compositions containing 12 wt % of the multiarmed radial asymmetric block copolymers prepared according to the examples 1 and 2, as well as 12 wt % of a commercially available radial multiarmed block copolymer grade identified by CARIFLEX TR-1116 having a molecular structure $X(SB)_4$, in two bitumen grades, identified with PX-200 and PX-180 respectively, were prepared and tested. (CARIFLEX is a trademark.)

The test results have been summarised in the following tables III and IV.

TABLE III

Properties of blends of 12% polymer in PX-200 bitumen

| Polymer<br>Polymer structure | | TR-1186<br>$(SB)_4$ | K-97<br>$m(SB)_4B_2$ | K-98<br>$m(SB)_2B_4$ |
|---|---|---|---|---|
| Properties: | | | | |
| Softening point | (°C.) | 121.5 | 120 | 100.5 |
| Penetration, 25° C. | (dmm) | 70 | 73 | 121 |
| Viscosity at 180° C. at | | | | |
| shearrate 20s$^{-1}$ | (Pa · s) | 4.13 | 3.34 | 0.35 |
| shearrate 100s$^{-1}$ | (Pa · s) | 3.74 | 2.95 | 0.35 |
| Cold Bend, pass | (°C.) | −25 | −30 | −25 |
| Flow, pass | (°C.) | 90 | 90 | 75 |
| Stress/strain properties | | | | |
| Yield stress | ($10^5$ · Pa) | 0.61 | 0.62 | 0.24 |
| Modulus 500% | ($10^5$ · Pa) | 0.90 | 0.97 | 0.55 |
| Max. stress | ($10^5$ · Pa) | 15.6 | 10.1 | 0.98 |
| Elong. at max. stress | (%) | 2302 | 1537 | 730 |
| Stress at break | ($10^5$ · Pa) | 13.5 | 7.4 | 0.87 |
| Elong. at break | (%) | 2466 | 1815 | 857 |
| Permanent set | (%) | 2.2 | 2.7 | 16–83* |

*sample broken

TABLE IV

Properties of blends of 12% polymer in B-180 bitumen

| Polymer<br>Polymer structure | | TR-1186<br>$(SB)_4$ | K-97<br>$m(SB)_4B_2$ | K-98<br>$m(SB)_2B_4$ |
|---|---|---|---|---|
| Properties: | | | | |
| Softening point | (°C.) | 125.0 | 121.5 | 100.5 |
| Penetration, 25° C. | (dmm) | 50 | 54 | 95 |
| Viscosity at 180° C. at | | | | |
| shearrate 20s$^{-1}$ | (Pa · s) | 2.77 | 1.87 | 0.62 |
| shearrate 100s$^{-1}$ | (Pa · s) | 2.39 | 1.61 | 0.62 |
| Cold Bend, pass | (°C.) | −20 | −15 | −5 |
| Flow, pass | (°C.) | 90 | 90 | 60 |
| Stress/strain properties | | | | |
| Yield stress | ($10^5$ · Pa) | 1.10 | 0.93 | 1.03 |
| Modulus 500% | ($10^5$ · Pa) | 1.12 | 1.13 | 0.99 |
| Max. stress | ($10^5$ · Pa) | 13.1 | 8.9 | 1.1 |
| Elong. at max. stress | (%) | 1949 | 1489 | 582 |
| Stress at break | ($10^5$ · Pa) | 11.8 | 7.1 | 0.9 |
| Elong. at break | (%) | 2100 | 1642 | 768 |
| Permanent set | (%) | 0.7 | 11.7 | 15–31* |

*sample broken

We claim:

1. A process for the manufacture of six-armed radial asymmetric block copolymers, comprising the steps of:

polymerization of a conjugated diene and/or a monoalkenyl aromatic hydrocarbon by means of an anionic monofunctional organo alkali metal initiator to form first polymer arms having a single reactive metal end group on each polymer arm;

contacting the first polymer arms with a non-polymerizable coupling agent containing 6 functional groups which react with the reactive end groups, the amount of the first polymer arms being substantially stoichiometrically corresponding with 4 of the 6 functional groups on the coupling agent, in a way that the reaction between the first polymer arms and the coupling agent proceeds substantially to completion;

preparing second polymer arms, different from said first polymer arms living polymer either in the same reactor or a different reactor by polymerization of a conjugated diene which is 1,3-butadiene and/or a monoalkenyl aromatic hydrocarbon initiated by an anionic monofunctional organoalkali metal initiator;

adding a polar compound capable of increasing the reactivity of the residual functional groups of the coupling agent and reacting these residual functional groups with the second polymer arms until all residual functional groups of the coupling agents have completely reacted; and recovering the six-armed asymmetric radial polymer.

2. The process according to claim 1, wherein the first polymer arms comprise predominantly poly(conjugated diene) blocks or diblocks consisting of a predominantly poly(conjugated diene) block segment and a predominantly poly(monovinyl aromatic hydrocarbon) and the second polymer arms comprise predominantly poly(1,3-butadiene) blocks or diblocks consisting of a predominantly poly(1,3-butadiene) block segment and a predominantly poly(monovinyl aromatic hydrocarbon).

3. The process according to claim 1, wherein the first polymer arms are selected from substantially pure homopolymers of 1,3-butadiene, substantially pure isoprene homopolymers, substantially pure homopolymers of styrene, and combination thereof.

4. The process according to claims 1, wherein the coupling agent is $Cl_3$—Si—$CH_2$—$CH_2$—Si—$Cl_3$ or (MeO)$_3$Si—$CH_2$—$CH_2$—Si(OMe)$_3$.

5. The process according to claim 1, wherein the first polymer arms is prepared by a polymerizing poly(styrene)-poly(butadiene) diblock segments or poly(styrene)-poly (isoprene) diblock segments, the diblock segments having a narrow molecular weight distribution and showing a high 1,4 polybutadiene polymerization degree, wherein the first polymer arms are coupling with four of the most reactive coupling sites of 1,2-bis(trichlorosilyl)ethane, and wherein the second polymer arms are prepared in the same reactor by polymerization of poly(butadiene) segments showing a low 1,4 polymerization degree and a broader molecular weight distribution.

6. The process according to claim 1, wherein the first polymer arms are contacted with the coupling agent at a temperature within the range of from 0° C. to 100° C., and at a pressure in the range of from 1 bar to 8 bar.

7. The process according to claim 1, wherein the polar compound is 1,2-diethoxypropane, dioxane, orthodimethoxy benzene, or diethylene glycol diethylether.

8. The process according to claim 7, wherein the polar compound is used at a concentration within the range of from 10 to 1000 ppm.

9. Six-armed radial asymmetric polymers obtained by a process of claim 1, comprising first polymer arms showing relatively narrow molecular weight distribution (Mw/Mn<1.1), and second polymer arms showing a relatively broad molecular weight distribution (Mw/Mn>1.1).

* * * * *